US 12,052,262 B2

(12) United States Patent
Weiss et al.

(10) Patent No.: US 12,052,262 B2
(45) Date of Patent: Jul. 30, 2024

(54) SYSTEM AND METHOD TO MANAGE PRIVILEGES

(71) Applicant: Authentic Vision GmbH, Wals (AT)

(72) Inventors: Thomas Weiss, Wals (AT); Thomas Bergmüller, Wals (AT)

(73) Assignee: Authentic Vision GmbH, Wals (AT)

( * ) Notice: Subject to any disclaimer, the term of this patent is extended or adjusted under 35 U.S.C. 154(b) by 386 days.

(21) Appl. No.: 16/617,373

(22) PCT Filed: May 25, 2018

(86) PCT No.: PCT/EP2018/063746
§ 371 (c)(1),
(2) Date: Nov. 26, 2019

(87) PCT Pub. No.: WO2018/215637
PCT Pub. Date: Nov. 29, 2018

(65) Prior Publication Data
US 2020/0099694 A1    Mar. 26, 2020

(30) Foreign Application Priority Data
May 26, 2017 (EP) .................................. 17173099

(51) Int. Cl.
*H04L 9/40* (2022.01)
*G06T 1/00* (2006.01)
(Continued)

(52) U.S. Cl.
CPC .......... *H04L 63/107* (2013.01); *G06T 1/0021* (2013.01); *H04L 9/0637* (2013.01);
(Continued)

(58) Field of Classification Search
None
See application file for complete search history.

(56) References Cited

U.S. PATENT DOCUMENTS 7,650,009 B2    1/2010   Rhoads
7,734,886 B1 *  6/2010   Van Riel ............. G06F 21/6218
                                                         711/170
(Continued)

FOREIGN PATENT DOCUMENTS

CN    101339592 A    1/2009
CN    104428798 A    3/2015
(Continued)

OTHER PUBLICATIONS

Lewin, S., 2014. Holographic displays coming to smartphones [News}. IEEE Spectrum, 51(8), pp. 13-16. (Year: 2014).*
(Continued)

*Primary Examiner* — Luu T Pham
*Assistant Examiner* — Edward X Long

(57) ABSTRACT

A system and method to manage privileges, wherein privileges are assigned to uniquely identifiable objects and a link between a uniquely identifiable object and a uniquely identifiable programmable device is established. The established link allows the uniquely identifiable programmable device to make use of at least a part of the privileges assigned to the uniquely identifiable object. The link is established under a set of preconditions, where at least the precondition of physical proximity between the uniquely identifiable object and the uniquely identifiable programmable device is verified. The uniquely identifiable object includes a irreproducible security device, which is registered to the uniquely identifiable object and can be used to verify physical proximity between the uniquely identifiable object and the uniquely identifiable programmable device by authenticating the irreproducible security device by optical authentication means. At least a part of the authentication process is carried out by the uniquely identifiable programmable device.

16 Claims, 6 Drawing Sheets

(51) Int. Cl.
H04L 9/06 (2006.01)
H04L 9/00 (2022.01)
H04W 12/63 (2021.01)

(52) U.S. Cl.
CPC ........ H04L 63/0853 (2013.01); H04L 63/101 (2013.01); H04L 9/50 (2022.05); H04W 12/63 (2021.01)

(56) References Cited

U.S. PATENT DOCUMENTS

| | | | |
|---|---|---|---|
| 7,986,806 | B2 | 7/2011 | Rhoads |
| 9,203,613 | B2 | 12/2015 | Roth et al. |
| 2005/0198243 | A1 | 9/2005 | Snible et al. |
| 2009/0070238 | A1 | 3/2009 | Moryto |
| 2009/0210940 | A1 | 8/2009 | Dean |
| 2012/0169461 | A1 | 7/2012 | Dubois, Jr. |
| 2013/0023339 | A1* | 1/2013 | Davis ................ G07F 17/3206 463/29 |
| 2014/0196119 | A1 | 7/2014 | Hill et al. |
| 2015/0127628 | A1 | 5/2015 | Rathod |
| 2015/0188706 | A1 | 7/2015 | Weiss |
| 2016/0294876 | A1 | 10/2016 | Lawrence et al. |
| 2017/0237570 | A1* | 8/2017 | Vandervort ......... H04L 63/0442 713/176 |
| 2019/0258204 | A1* | 8/2019 | Nelson ................... G06K 19/16 |

FOREIGN PATENT DOCUMENTS

| | | |
|---|---|---|
| CN | 104981815 A | 10/2015 |
| CN | 105894268 A | 8/2016 |
| EP | 0266748 A2 | 5/1988 |
| EP | 1990212 A1 | 11/2008 |
| EP | 3154015 A1 | 4/2017 |
| EP | 3293680 A1 | 3/2018 |
| EP | 3632075 A1 | 4/2020 |
| JP | 2012100294 A | 5/2012 |
| KR | 1020100071738 A | 6/2010 |
| WO | 2015079014 A1 | 6/2015 |
| WO | 2016034555 A1 | 3/2016 |
| WO | 2018172498 A1 | 9/2018 |
| WO | 2018215637 A1 | 11/2018 |

OTHER PUBLICATIONS

Makris, A., et al., Nov. 2021. Cloud for holography and augmented reality. In 2021 IEEE 10th international conference on cloud networking (CloudNet) (pp. 118-126). IEEE (Year: 2021).*
Gadekallu, T.R., Huynh-The, T., Wang, W., Yenduri, G., Ranaweera, P., Pham, Q.V., da Costa, D.B. and Liyanage, M., 2022. Blockchain for the metaverse: A review. arXiv preprint arXiv:2203.09738. (Year: 2022).*
Korean Office Action; Application No. 10-2019-7037991; Issued Aug. 25, 2021; 8 Pages.
Chinese Office Action; Application No. 2018800344335; Issued: Jun. 24, 2021; 18 Pages.
Extended European Search Report Application No. 17173099.7 Completed: Jul. 19, 2017; Mailing Date: Jul. 31, 2017 6 Pages.
International Search Report and Written Opinion of the International Searching Authority Application No. PCT/EP2018/063746 Completed: Jun. 20, 2018; Mailing Date: Jun. 28, 2018 12 Pages.

* cited by examiner

SYSTEM AND METHOD TO MANAGE PRIVILEGES

TECHNICAL FIELD

In the early 2000's, the term "Internet of Things" (IoT) has become popular, describing the inter-networking of physical objects. While there's a proliferation of concepts, visions and ambitions to integrate physical objects into existing computer-networks, it is safe to say that the IoT is far from being ready for practical use yet. One of the first problems to emerge was to uniquely identify and address all participants/objects. This issue has already been overcome with IPv6. Another challenge is that objects (things), which should interact, need to be equipped with additional hardware, i.e. a network interface. While a network-uplink can be provided wireless nowadays, it is still necessary for the interacting object to comprise a wireless network interface, preferably a processing unit (CPU) and—most of all— power supply. Among others, these aspects hinder to implement IoT at a faster pace, as objects, which may interact with the IoT, get more expensive, need a permanent power supply (or regular recharging) etc. In one embodiment, it is subject to the present teaching to provide a setup, which enables the integration of ordinary objects, i.e. without digital processing capabilities and/or power supply, into the IoT. The idea is to share the hardware of a programmable device with the object.

In another embodiment, with the present teaching objects may act as physical keys to digital contents. In particular, physical objects may be used to empower e.g. their owner and/or a specific programmable device to access certain pre-defined digital services and/or data by granting privileges.

BACKGROUND

The present teaching concerns a system to manage privileges. The system comprises uniquely identifiable objects (which may not have digital processing capabilities of their own), uniquely identifiable programmable devices and a method to ensure at least physical proximity between the uniquely identifiable objects and the uniquely identifiable programmable devices. Certain privileges are pre-registered to the identifiers of the uniquely identifiable objects, e.g. in a data base. Physical proximity between a particular uniquely identifiable programmable object and a particular uniquely identifiable programmable device is ensured by optical authentication means. For this purpose, the uniquely identifiable object comprises a unique and irreproducible security device, which is also pre-registered to the object identifier. The security device may then be authenticated by optical authentication means, e.g. with a camera. In a preferred embodiment, the security device comprises an optically variable device (OVD) with random characteristics. The random characteristics ensure the irreproducibility of the security device, while registering the random characteristics to the object identifier ensures its uniqueness. Registration may be achieved with a data base storing associations between digital representations of the irreproducible security devices and the unique object identifiers; alternatively, the object identifier may comprise a representation of the registered irreproducible security device. Using optically variable devices ensures that the irreproducible security device cannot be copied by photocopy-means. In said preferred embodiment, the security device may be authenticated by taking at least two pictures from different angles of view, to verify that it is indeed an OVD. Example of suitable production processes for producing such security devices are exhibited in WO 2015/079014 A1. In a preferred embodiment, special security foils, e.g. as introduced in more detail in European patent application No. 16188357.4 or 17162789.6 may be used.

The introductory IoT-embodiment can be seen as a special-case of granting privileges. The uniquely identifiable programmable device "shares" its hardware with the physical object, by executing a program which was pre-defined and registered to the uniquely identifiable object. This is pretty similar to the concept of Virtual Machines, where one hardware is shared by multiple virtual machines. In our case, the virtual machine is the computer program, pre-defined for the uniquely identifiable object. In terms of the present teaching, the privilege to execute that particular computer program in the name of the uniquely identifiable object was granted to the uniquely identifiable device, because physical proximity between the uniquely identifiable object and the uniquely identifiable programmable device could be verified.

STATE OF THE ART

A well-known technology to ensure physical proximity between two devices is RFID, as introduced for example in US 2009/0210940 A1. There are several short-comings of RFID-based solutions, for example per-unit costs, distribution of reading devices and limited fields of applications. RFID-tags have relatively high manufacturing costs, typically exceeding $0.05. Especially if secure RFID-tags are used, which are harder to reproduce, the costs are magnitudes higher. On the other end, RFID-reading devices are wide-spread, but not standard. Most of today's smart-phones do have RFID-sensors for Near-field communication (NFC), although one major manufacturer has not followed the trend so far. Yet many people are unaware of this feature in their smartphones and often it has to be turned-on explicitly, since the power-consumption is comparatively high. It is one aspect of the present teaching to overcome those shortcomings by using a security device, which can be authenticated with optical sensors, i.e. a camera, where this authentication is used to prove the proximity between a security device—and therefore the object it is attached or integrated to—and a uniquely identifiable programmable device, e.g. a smart-phone. The limited field of application is probably next to impossible to overcome. RFID is based on electromagnetic waves. Consequently, if an RFID-tag is placed on a metal object or a bottle with liquids, these materials in the RFID-tag's immediate surroundings may limit the readout or even disable the RFID-tag, because the electromagnetic waves are damped or blocked.

If a security device is used to verify physical proximity between two uniquely identifiable entities, e.g. a uniquely identifiable programmable device and a uniquely identifiable object, the security device is required to be unique as well. Even more so, it needs to be irreproducible. In a typical setting, devices and objects are made uniquely identifiable by using identifiers, e.g. serials, UID or other unique codes. However, all of these identifiers or codes can be copied and therefore reproduced easily. This implies that multiple entities with the same unique identifier can be produced, consequently breaking the uniqueness constraint. One approach now is to equip the unique identifier with a security device, which is hard to counterfeit, e.g. said RFID tags. So as long as the legitimate producer of the security devices issues precisely one unique security device per uniquely identifiable object, a sufficient level of protection is achieved. At least the costs of copying a uniquely identifiable object are higher, since also the unique security device needs to be cloned.

RFID-Tags are widely used here, because they can encode Unique Identifiers, which are e.g. cryptographically signed. Reproducing such tags would at least imply to read out the RFID-tag's content and programming a new tag with the identical content. If the mentioned secure RFID-tags are used, the read-out process is prevented. Conceptually similar, EP 0 266 748 A2 for example describes so called USB-dongles, which are functionally equivalent to RFID-Tags, yet physical proximity is ensured by plugging the USB-dongle, hence the security device which may at the same time be the object, into the uniquely identifiable programmable device.

Because of the mentioned short-comings of RFID, approaches with unique, optically authenticable, security devices are known as well. For example, U.S. Pat. No. 7,650,009 B2 describes a method to capture a photo, steganographically enhance it with a digital key ("snowflake image") and use this as random unique security devices. The randomness is achieved by capturing a random photo while the digital key adds some additional variation here. Similar, the U.S. Pat. No. 7,986,806 B2 exhibits a method to use steganography means to embed digital content (e.g. unique identifiers) into an image (which can be considered to be random). One major shortcoming of such security devices is that they can be copied. This can be easily verified in practice e.g. using a photo-copier or taking a video of such a security device, wherein the photocopy or video allows authenticating from there.

US 2012/1694 61 A1 concerns an electronic access control system for secured rooms. In this case, a cellular telephone is used as an authorizing device. To enable access through a portal/door, the telephone is brought into the vicinity of an identifying mark. The access control system therefore determines the door for which access is to be enabled on the basis of the identifying mark recorded by the telephone. In addition to identifying the door or portal, the telephone needs to authenticate the user.

There is one aspect all of the introduced technologies share; they are reproducible. Agreeably, while RFID-tags are hard to reproduce by illegitimate third parties, all of those technologies can be reproduced by the legitimate issuer per definition, simply because they are all based on digital content. This makes such security features vulnerable, especially if data-leakage, double-producing, bribery and other non-technical attack vectors are considered. Especially such security devices cannot be employed in licensing compliance use-cases, where the number of issued security devices corresponds to a charged fee. It is another aspect of the present teaching to introduce an irreproducible security device, which can be authenticated with ordinary optical authentication means, i.e. without the need of special devices such as magnifying lenses etc. The introduced security devices can be authenticated with any programmable device comprising a camera, i.e. a smart-phone, tablet-PC or with a personal computer comprising a webcam. By using standard and wide-spread equipment, e.g. an ordinary camera, a large number of people may engage with the proposed present teaching without needing to acquire or purchase additional equipment.

SUMMARY

The present teaching concerns a system to manage privileges, wherein the privileges are assigned to a uniquely identifiable object and a link between the uniquely identifiable object and a uniquely identifiable programmable device is established, wherein the established link allows the uniquely identifiable programmable device to make use of at least a part of the privileges assigned to the uniquely identifiable object and where the link is established under a set of preconditions, where at least the precondition of physical proximity between the uniquely identifiable object and the uniquely identifiable programmable device is verified and the uniquely identifiable object comprises a irreproducible security device, which is registered to the uniquely identifiable object and can be used to verify physical proximity between the uniquely identifiable object and the uniquely identifiable programmable device by authenticating the irreproducible security device by optical authentication means wherein at least a part of the authentication process is carried out by the uniquely identifiable programmable device.

In particular, the uniquely identifiable object may be a uniquely identifiable article or uniquely identifiable product.

In a preferred embodiment of the present teaching one or more of a group of additional preconditions are verified to establish a link, said group of additional preconditions comprising: the geographic location of the uniquely identifiable programmable device is within a predefined geographic area; or other data which may be retrieved from the uniquely identifiable programmable device's sensors or memory, wherein a link can only be established, if this data corresponds to certain pre-configured values.

It has turned out advantageous that the privileges are stored in a centralized or distributed data base.

In one embodiment, a privilege is the permission to access a computer program, which may be executed on the programmable device, or the permission to trigger the execution of a computer program on a third device, in particular on a server, with the uniquely identifiable programmable device and/or the permission to establish a link.

Additionally or alternatively, a privilege may grant access to a data base and allows changing privilege assignments.

In a preferred embodiment, the established links are recorded in a centralized or distributed data base.

The data base may comprise a blockchain structure, which ensures integrity of all transactions (established links) in the system without requiring a trusted authority, i.e. a trusted data base of established links.

In a preferred embodiment of the present teaching, the irreproducibility is achieved in that the security device comprises a 3-dimensional structure having a random distribution of perspective-dependent optical characteristics which are registered to the object identifier and the uniquely identifiable programmable device comprises a camera which may be used to capture at least two images of said security device from at least two different perspectives or with two different lighting conditions.

The uniquely identifiable object may comprise an object identifier, wherein said object identifier is encoded in human- or machine-readable format, in particular as numerical or alpha-numerical number or as a barcode or 2D code. The use of machine-readable codes, such as barcodes or 2D codes, turned out beneficially, since the identifier has to be read by the uniquely identifiable programmable device. In an additional or alternative embodiment, human- and machine-readable representations of the same identifier may be used in parallel.

In a preferred embodiment, the link between the uniquely identifiable object and the uniquely identifiable programmable device comprises two or more connected intermediary links, in particular a first intermediary link between the uniquely identifiable object and a user-account and a second intermediary link between said user-account and the uniquely identifiable programmable device. The link between the uniquely identifiable object and the uniquely identifiable programmable device is established by establishing and connecting the intermediary links, wherein for establishing at least one of the intermediary links, the preconditions defined above must be met. The remaining intermediary links may or may not be established independent of the preconditions.

In general, the present teaching concerns a system for managing (i.e. granting and providing) privileges, comprising:
at least one object (or article or product) with
a unique object identifier and
an irreproducible security device;
at least one programmable device
having a unique device identifier and
comprising an optical authentication means (e.g. a camera connected to a computer); and
a database
storing one or more privileges associated with a unique object identifier, and
storing one or more links between a unique device identifier and a unique object identifier;
wherein said system is configured to establish a new link between a unique device identifier of a programmable device and a unique object identifier of an object only after a successful verification of certain preconditions, which comprises at least an authentication of an irreproducible security device of said object with an optical authentication means of said programmable device,
and wherein said system is configured to determine privileges of a programmable device by determining one or more unique object identifiers linked to a unique device identifier of said programmable device and determining one or more privileges associated with one or more determined unique object identifiers as privileges of said programmable device.

The present teaching also concerns a method for acquiring privileges with a programmable device having a unique device identifier, comprising:
capturing with the programmable device at least two images, wherein at least one image pictures a unique object identifier of an object (or article or product) and at least two images picture an irreproducible security device of said object;
authenticating the irreproducible security device based on the at least two images;
if all preconditions of a set of preconditions are fulfilled, establishing a link between the unique device identifier and the unique object identifier, wherein the set of preconditions comprises at least the precondition that the irreproducible security device can be authenticated,
wherein one or more privileges are associated with the unique object identifier,
wherein at least a part of said one or more privileges is granted to any programmable device having a unique device identifier linked to the unique object identifier.

As pointed out above, establishing a link may be achieved by establishing an intermediary link (e.g. between the unique object identifier and a unique account identifier), wherein two or more connected intermediary links together form the link between the unique device identifier and the unique object identifier (e.g. another intermediary link between the unique account identifier and the unique device identifier may have been established beforehand, for instance by registration of the programmable device to a user-account).

In a preferred embodiment of the present method, the authenticating the irreproducible security device comprises:
extracting a digital representation of one or more optical security features from the at least two images;
comparing the digital representation with a reference;
authenticating the irreproducible security device if the digital representation matches (either exactly or by having a suitable distance measure smaller than a certain threshold) the reference.

More specifically authenticating the irreproducible security device may comprise:
obtaining the reference from a data base, preferably by querying the data base with the captured unique object identifier.

In order to achieve exclusive ownership of privileges associated with an object, the method may be further characterized by:
before establishing a link between the unique device identifier and the unique object identifier, determining whether the unique object identifier is already linked to one or more different unique device identifiers;
establishing a link between the unique device identifier and the unique object identifier only if the unique object identifier is not linked to any different unique device identifier.

According to a preferred embodiment of the present teaching, establishing a link between the unique device identifier and the unique object identifier comprises storing an association between the unique device identifier and the unique object identifier in a data base.

In addition, and corresponding to the above methods, the present teaching also concerns a method for determining privileges of a programmable device having a unique device identifier, comprising:
retrieving a list of valid links of the unique device identifier from a centralized or distributed data base;
determining one or more unique object identifiers linked to the unique device identifier according to the retrieved list of valid links;
determining one or more privileges associated with one or more determined unique object identifiers as privileges of the programmable device.

The retrieving of the list of valid links and determining of the linked unique object identifiers and of the associated privileges may be performed by querying the data base with the unique device identifier and/or the unique object identifiers respectively.

The list of valid links is a collection of all links established by authenticating an irreproducible security device with the programmable device; more in detail, the links are established according to the method for acquiring privileges as described above. Invalid links can be omitted from the list; i.e. preferably only valid links are retrieved in order to determine privileges of a programmable device having a unique device identifier.

BRIEF DESCRIPTION OF THE DRAWINGS

The present teaching will be defined in more detail below by means of preferred exemplary embodiments, to which it is not to be limited to, however, and with reference to the drawings. In detail.

DETAILED DESCRIPTION

Figure 1:
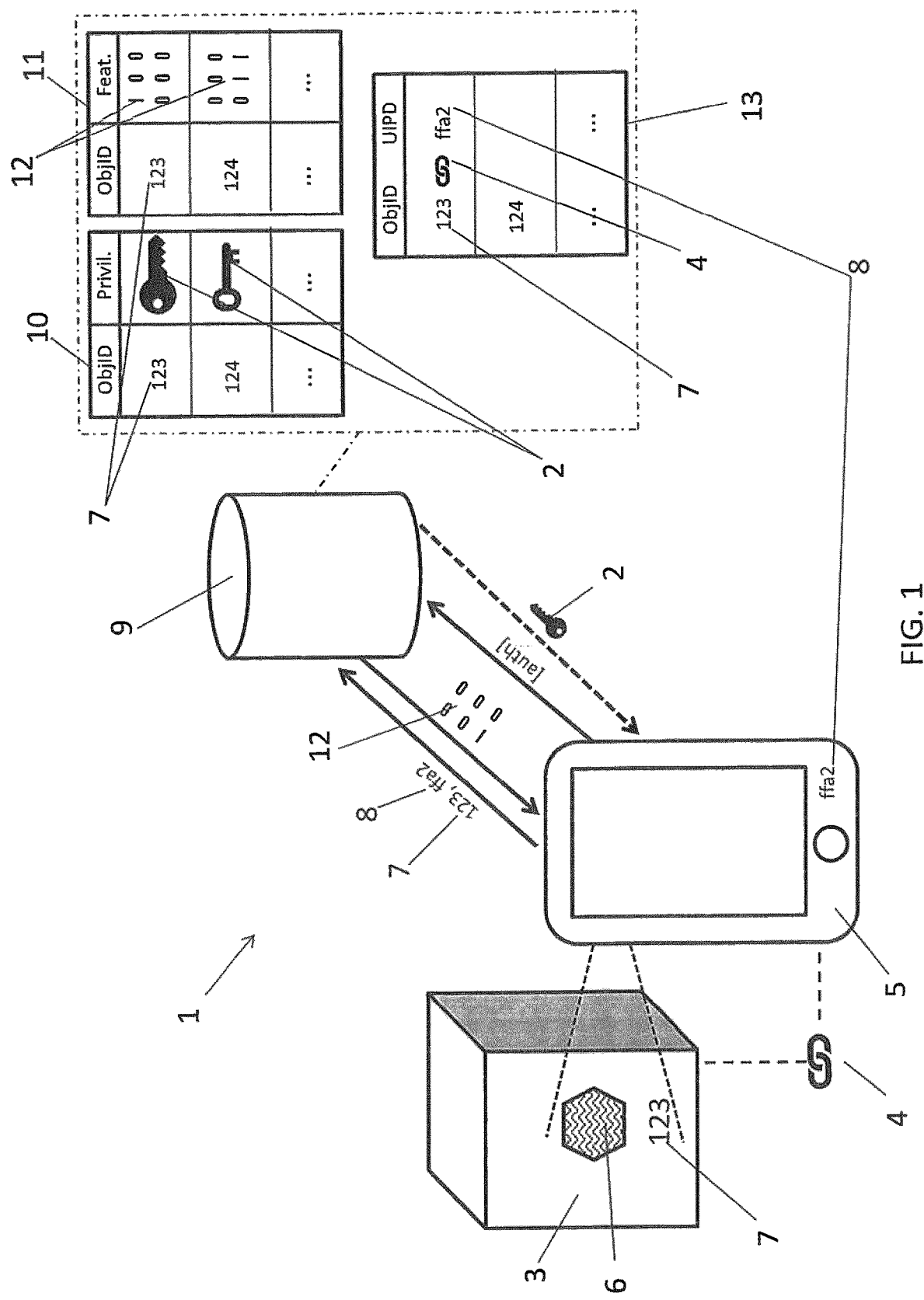
FIG. 1 schematically on overview of a system to manage privileges according to the present teaching.

The present teaching comprises a system 1 to manage privileges 2, where the privileges 2 are assigned to a uniquely identifiable object 3. A link 4 between the uniquely identifiable object 3 and a uniquely identifiable programmable device 5 is established under certain preconditions, at least the precondition of physical proximity between the uniquely identifiable object 3 and the uniquely identifiable programmable device 5. An established link 4 can enable the uniquely identifiable programmable device 5 to use at least a part of the privileges 2 assigned to the uniquely identifiable object 3. The physical proximity is ensured by authenticating an irreproducible security device 6 of the uniquely identifiable object 3 by optical authentication means, e.g. by capturing it with a camera, of the uniquely identifiable programmable device 5. The images are then processed, e.g. on the uniquely identifiable programmable device 5 and used for authenticating the irreproducible security device 6. Said irreproducible security device 6 is registered to the uniquely identifiable object 3, and therefore a positive authentication result proves physical proximity between the irreproducible security device 6, which is attached to or part of the uniquely identifiable object 3, and the uniquely identifiable programmable device 5.

In a preferable setting, the uniquely identifiable object 3 comprises a unique object identifier 7. In the present embodiment, the unique object identifier 7 is a serial number, which may be encrypted or cryptographically signed. Similar, any other method for generating unique object identifiers may be used. The programmable device 5 may be identified by any suitable unique device identifier 8, for example via MAC-address, Hardware-Hash or similar well-known methods of generating a UID for hard- or software solutions.

The privileges 2 are assigned to a uniquely identifiable object 3 via the unique object identifier 7. In a preferable setting, the privileges 2 may be stored together with the unique object identifier 7 in a data base 9, which can be accessed by the uniquely identifiable programmable device 5. As soon as the mentioned link 4 is established between the uniquely identifiable object 3 and the uniquely identifiable programmable device 5, the uniquely identifiable programmable device 5 is legitimated to make use of the privileges 2 registered to the uniquely identifiable object 3 via the unique object identifier 7 according to a first table 10 of the data base 9. In other words, the privileges 2 are "transferred" to the uniquely identifiable programmable device 5. Since privileges 2 and links 4 are rather abstract concepts, their nature and properties will be discussed in the next section based on but not limited to some examples.

Establishing a link 4 is constrained by at least a positive authentication result of an irreproducible security device 6. Several considerations need to be taken into account when selecting a suitable security device. We will subsequently list a number of attack scenarios and will from them conclude on the requirements for a suitable product authentication technology. First, the security device needs to be resistant to copying and replication. Naturally, if the security device can be copied or replicated, one can easily equip multiple objects with a copied security device. In the present teaching, the security device is used among other things to verify the authenticity (and therefore uniqueness) of the unique object identifier 7. This implies, if the security device can be copied or replicated, an illegitimate third party may issue a theoretically unlimited number of physical objects, all sharing the same object identifier 7, which all will due to the copied security device enable a link with a programmable device 5.

Per definition, any security device can be counterfeit. It is just a matter of resources/costs which distinguishes a good security device from an unsuited one. A security device is considered to be secure, if the costs of counterfeiting it are higher than the value gained by issuing a counterfeit entity of an object protected with this security device. In the present use-case, counterfeiting the security device should require resources that exceed the value gained by the illegitimately acquired privileges through the illegitimate link established based on a counterfeit object, i.e. a counterfeit security device. In a beneficial setting, unique security devices are preferred over static ones (as they are reproducible by definition). Imagine that a static security device is used, in particular one that is independent of the object identifier. As mentioned, the object identifier is typically a serial number or any other (digital) combination, which is in general easy to reproduce. Consequently, if the security device is independent from the object identifier, one could exchange the object identifier at will and therefore get illegitimately privileges registered to the illegitimately used object identifier. Presume object identifier "123" identifies some an object linked to basic privileges, while object identifier "124" identifies an object with very high-valued privileges. Now, if the same security device entity authenticates object identifiers, "123" and "124" the following attack scenario emerges: One could purchase the object identified by "123", which has a valid security device and is presumably cheaper than the object with the higher-valued privileges. Then, the object identifier is illegitimately changed from "123" to "124". Since the static security device authenticates also object identifier "124", it is therefore possible to create illegitimately a link between object identifier "124" and a uniquely identifiable programmable device, which is then able to use the registered privileges. The main aspect of this attack is, that there is no need to counterfeit the security device, since it authenticates more than one object identifier. Hence the security device should be designed in a way that it precisely authenticates one particular object identifier. Such security devices are often referred to as unique security devices. According to the present teaching, the security device is also irreproducible. Such irreproducible security devices 6 are characterized by having three-dimensional and random (or stochastic) properties. Further, the irreproducible security device 6 is registered to the unique object identifier 7 according to a second table 11 of the data base 9. Said second table 11 stores associations between unique object identifiers 7 and digital representations 12 of the corresponding (e.g. attached) irreproducible security devices 6. This helps to ensure that a particular object identifier 7 is secured by a particular entity of the irreproducible security device 6. Such a setting increases security significantly. If reproducible or deterministic security devices are used, a fraudulent reproduction of the security device may be employed to illegitimately equip multiple uniquely identifiable objects with it. Reproducible security devices are e.g. all security features which are generated digitally or those, where common properties among multiple instances are used for authentication, e.g. microprinting, watermarks or static (i.e. non-random) optically variable devices. Even more so, using reproducible security devices allows to equip multiple objects with the same object identifier and security device, which consequently voids the uniqueness constraint, given that the properties of the security device are known. These properties can either be known because the legitimate producer issues illegitimate clones (e.g. bribery, double-produce) or because they have been re-engineered from another object entity.

Therefore, irreproducible security devices 6, which are registered to the unique object identifier 7, help to ensure that each object can indeed be uniquely identified.

Said irreproducible security devices 6 should be authenticated by optical authentication means (not shown), in a preferable setting (but not limited to this type of security device) with a simple camera without any special equipment. For example, an ordinary smart-phone camera could be used. Such security devices are already known. In earlier work, we presented a method to produce such security features (see WO 2015/079014 A1) and introduced a system to authenticate such (WO 2016/034555 A1). Furthermore, we presented an optimized sheet-like product and method for authenticating such a security device (see European patent application no. 16188357.4). Summing up, in a preferable setting such irreproducible security devices 6 comprise random, three-dimensional optically variable, properties, especially changing optical characteristics when observed from different perspectives and/or with different light sources. By having the camera capture at least two images from at least two different perspectives, these properties may be examined by evaluation of the respective appearance and/or a change of appearance. This property is crucial to make the security feature resistant to photocopying. The randomness involved originates from the manufacturing tolerances in the production and/or application process of such security devices and manifest e.g. in the position, distribution and/or optically variable characteristics. By capturing and examining those random features and registering their digital representations 12 to the object identifier 7, an irreproducible security device 6 can be produced. This security device is characterized by being authenticable with a standard camera. For example (but not restricted to) diffractive optically variable devices (DOVIDs), often referred to as holograms, or lenticular technology may be used here. Furthermore, other technologies which rely on the stochastics in manufacturing tolerances may be used. In particular, using at least a part of the object itself as a security device may be considered, as suggested in e.g. US 2015/0188706 A1 or European patent application EP 3 154 015 A1.

Further, additional preconditions for establishing a link 4 may be introduced. For example, it might be useful for some applications, if a link 4 can only be established in a certain (geographical) area. This is equivalent to the privileges only being granted, if the uniquely identifiable object 3 is at a certain location. The object's location may be determined by the uniquely identifiable programmable device 5, as it corresponds (through the physical proximity) to the object's location. Naturally, also other data, which can be obtained from the uniquely identifiable programmable device's sensors, input or memory, may be used to add more preconditions or constraints to establish a link 4.

As we use the uniquely programmable device's data here and transform it into "properties" of the object (because it is physically close and therefore the uniquely identifiable programmable device's data corresponds with the object's properties), it is of particular importance that the security device can only be authenticated if it is indeed physically close to the authentication device, i.e. the uniquely identifiable programmable device.

Therefore the system beneficially employs spoofing detection. In a spoofing attack e.g. the three-dimensional (optical) security features evaluated by a camera may be recorded on video. The video may then be transferred by digital file sharing means and the video is then presented to the programmable device 5. Detecting replays may be particularly relevant, since replaying e.g. a video in front of the uniquely identifiable programmable device's camera may be capable to trick the system. Any means of spoofing detection may be used, there are several applicable methods known in the field of image processing, e.g. from biometric sensors (iris recognition, . . . ).

Once all applicable preconditions are met, the uniquely identifiable programmable device 5 informs the data base 9 of the successful authentication and a new link 4 is created in a third table 13 of the data base 9, wherein the link 4 is represented as an association between a unique object identifier 7 and a unique device identifier 8.

Privileges and Links

A valid link 4 between the uniquely identifiable object 3, formed e.g. by a physical product, and the programmable device 5 is established, in order to make the privileges 2 registered to the object 3 via the object identifier 7 accessible to the uniquely identifiable programmable device 5. If the link 4 becomes invalid, for example because another uniquely identifiable programmable device connects to the physical product or the validity-time span of the link has elapsed, the uniquely identifiable programmable device 5 loses the privileges 2. Another way to look at it is that the physical product acts as a key, which activates or unlocks the digital content or the execution of a computer program on a programmable device.

There is a variety of modes for the links like the link 4 regarding their validity. The validity of the links can either be managed on the programmable device (this case is not pictured) or in table or record of links 13, which may be located in a centralized or distributed data base 9. As examples, FIGS. 2-5 show a simplified link-sequence over time 14 and the corresponding data in a centralized or distributed data base 9 at different points in time (for simplicity, only one table 13 of the data base 9 storing the links 4 is indicated).

(Note that records of links are kept for illustrational purposes. Invalid links are depicted grey and as strikethrough. However, it may also be beneficial to keep these records for analytic purposes in a practical application and maintain a "valid" flag, indicating the state of the link).

Figure 3:
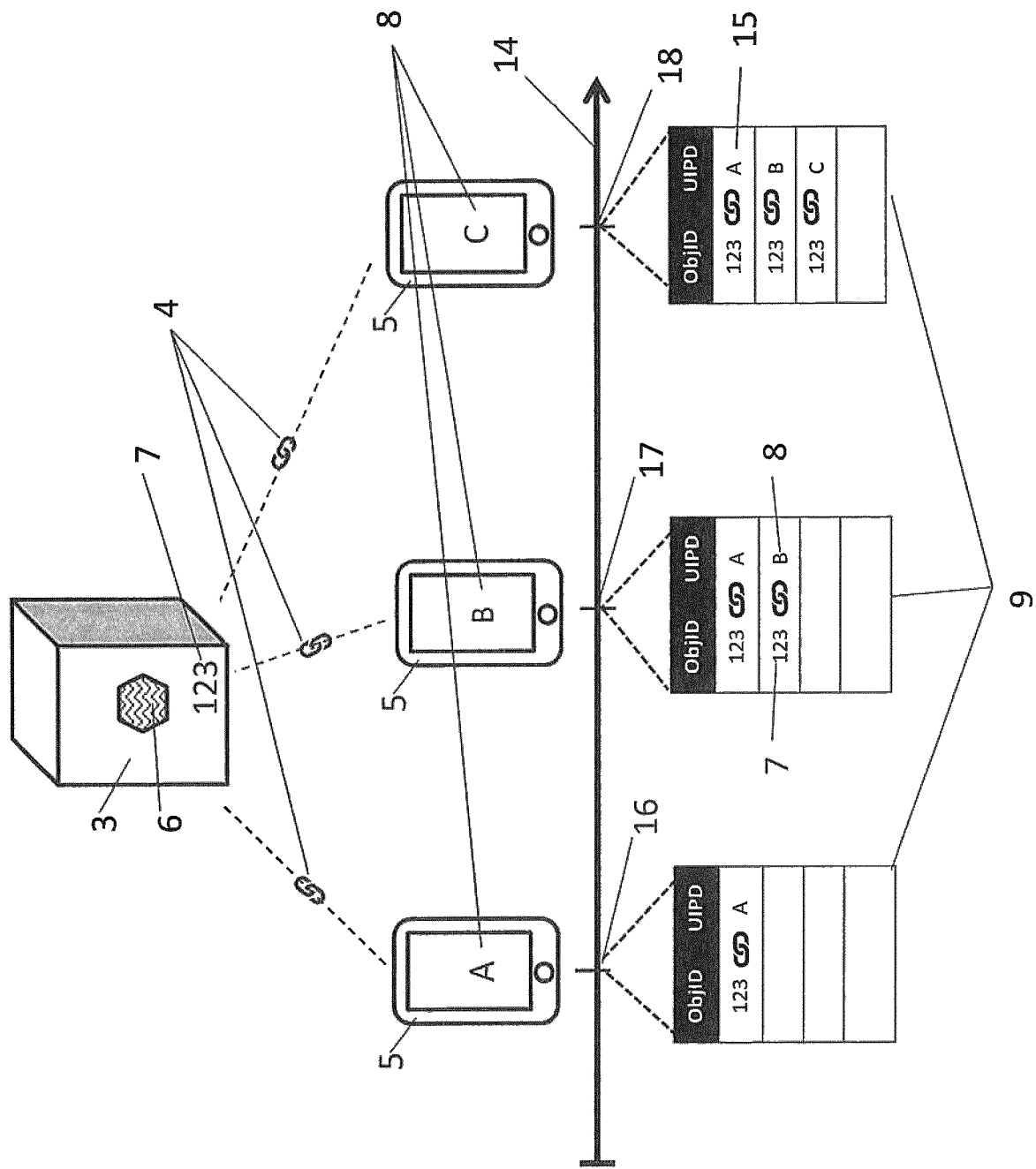
FIG. 3 is similar to FIG. 2, except that the system allows multiple programmable devices to be linked with the same uniquely identifiable object.

Permanent links, as shown in FIG. 3, basically maintain a list 15 of established links 4. This means, as soon as a programmable device 5 establishes a link 4 based on the object identifier 7 and the unique device identifier 8, it is valid and remains so. Therefore, if a programmable device 5 with the unique device identifier 8 "A" establishes a link at authentication time 16, at the same time a link 4 is established. Similar, the list of valid links is extended at a later authentication time 17 with an entry for a programmable device 5 with the unique device identifier 8 "B" and so on. Therefore, the list 15 of valid links 4 stored in the data base 9 permanently increases and records a linking-history. This enables e.g. Track & Trace solutions or scan history, which may be used for supply chain management etc. Consequently, each programmable device 5 which has established a link 4, is permanently granted privileges 2 registered to the object identifier 7, even if the object is not present (hence physically close) all the time.

Figure 2:
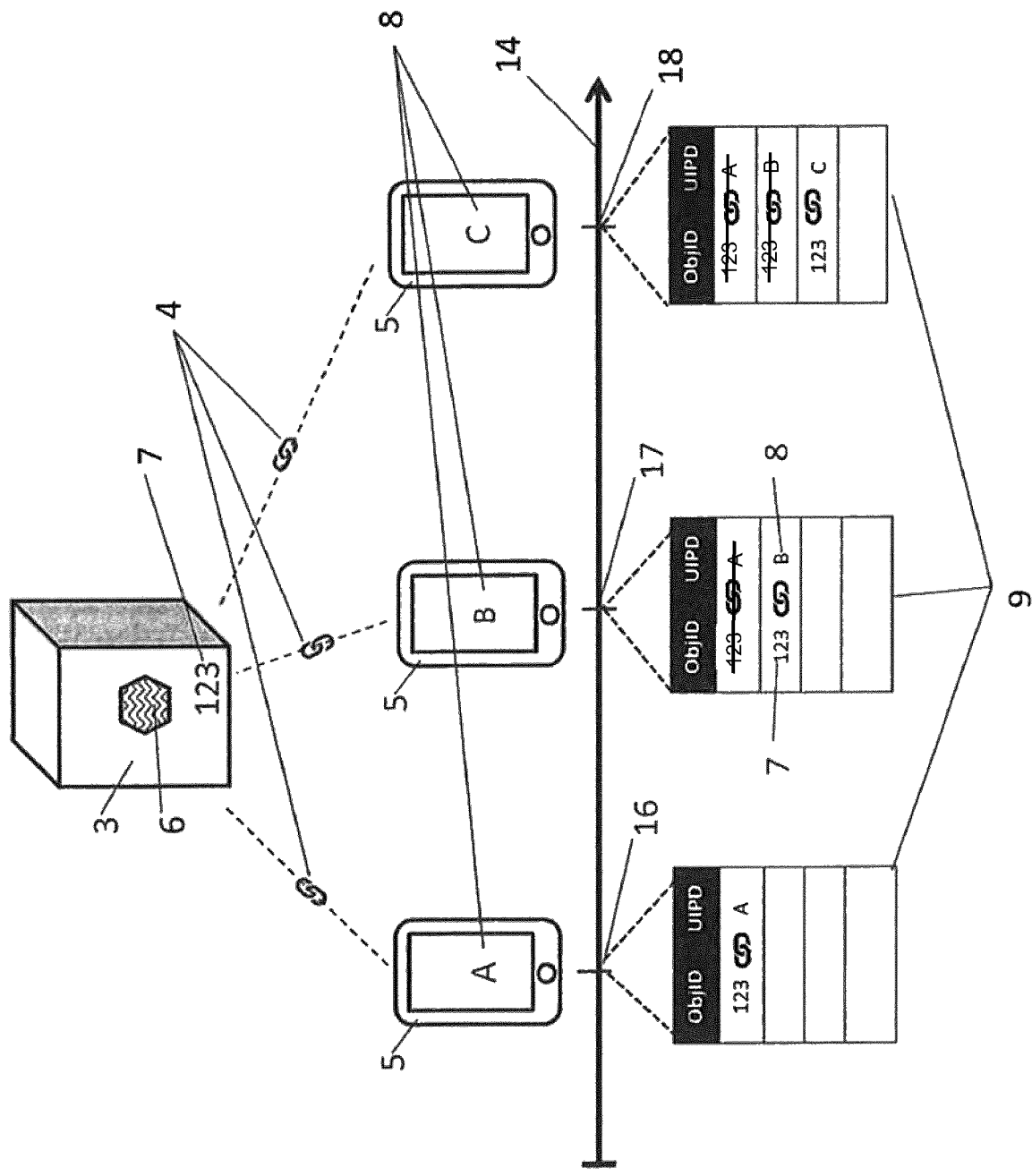
FIG. 2 schematically a change of an exclusive link between a uniquely identifiable object and different programmable devices over time.

Quantity-limited links may be used when at most a certain number of N links may be established between programmable devices and an object. FIG. 2 displays a special case, where at most N=1 uniquely identifiable programmable devices may link to an object. This special case can be seen as uniquely identifiable programmable devices 5 claiming ownership of a uniquely identifiable object 3. Naturally, as long as one programmable device 5 claims ownership over the uniquely identifiable object 3 (by having a valid link 4), no other programmable device 5 may do so. If a programmable device 5 with the unique device identifier 8 "A" establishes a valid link 4 at authentication time 16, this link 4 is stored in a data base 9. If later another programmable device 5 with the unique device identifier 8 "B" establishes a valid link 4 at a later authentication time 17, the so far linked programmable device 5 with the unique device identifier 8 "A" is unlinked from the uniquely identifiable object 3, i.e. the link 4 between object identifier 7 and device identifier 8 "A" becomes invalid. Then a new link 4 is added, forming a valid link 4 between the object identifier 7 and the device identifier 8 "B" of a different programmable device 5. Depending on the field of application, different strategies may be used. For a "claim ownership" use-case, it may rather be beneficial to not allow the establishment of new links 4, if there is already a valid link present in the data base 9. Consequently, the link 4 between a programmable device 5 identified by "A" (a first programmable device) and the object identifier 7 may need to be invalidated/erased/cleared for transaction by the user of the uniquely identifiable programmable device identified by "A". Only then, a programmable device 5 identified by "B" (a second programmable device) may establish a new link 4 to the same object identifier 7. With this mode, it is possible to uniquely link a programmable device 5 via its device identifier 8 to a uniquely identifiable object 3 in a permanent manner. Consequently, privileges 2 are only granted to a particular programmable device 5, if it "owns" the uniquely identifiable object 3, i.e. if there is a valid link 4 between the unique object identifier 7 and the device identifier 8.

Figure 4:
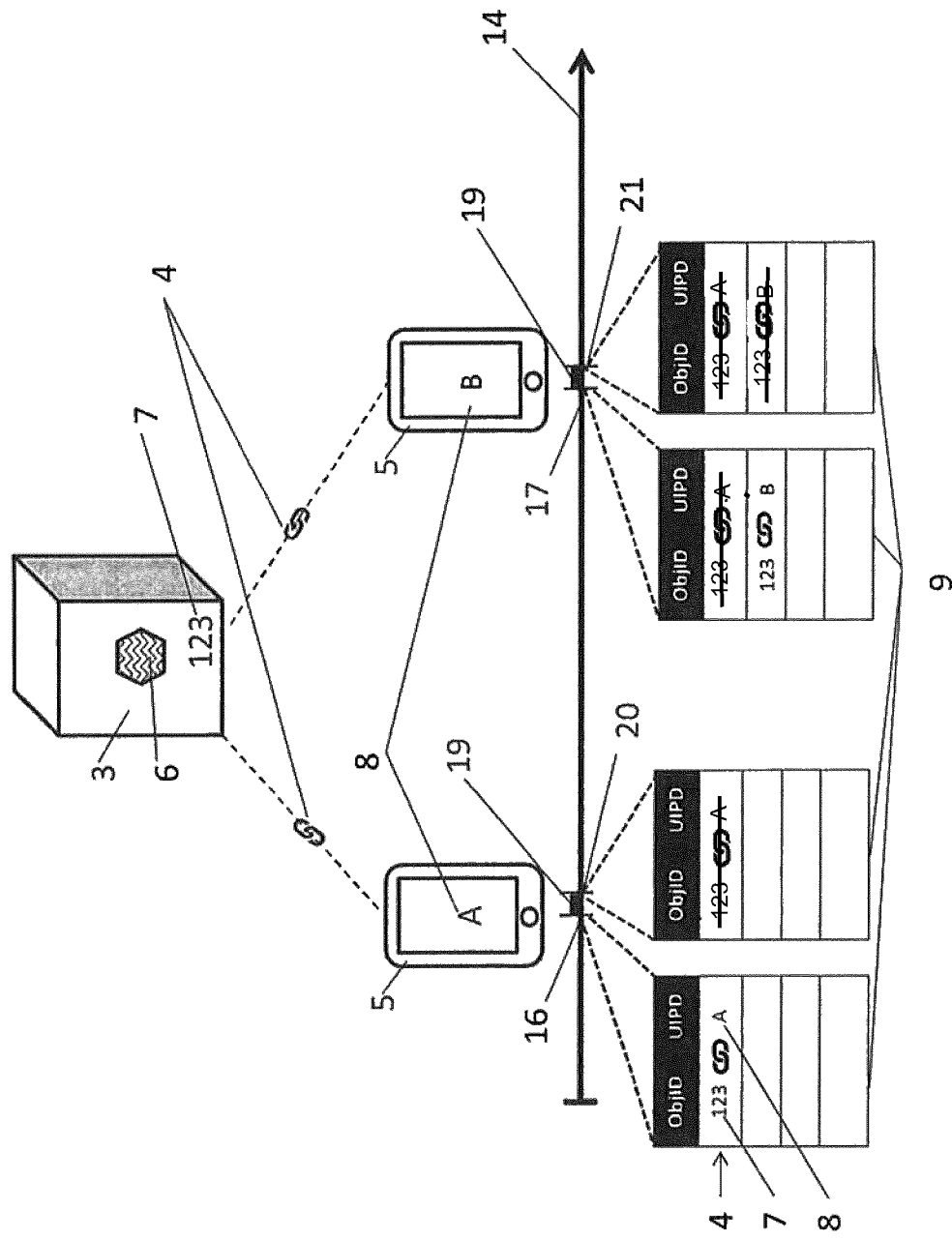
FIG. 4 schematically illustrates the assignment of time limited privileges to different programmable devices over time.

Limited-access links 4, as shown in FIG. 4, allow to use or exercise a privilege 2 only a single or a limited predefined number of time(s) 19, where one or more privileges 2 assigned to the object identifier 7 may be used by the uniquely identifiable programmable device 5. FIG. 4 shows a single-execution mode, where precisely one use of a privilege 2 is permitted. The link 4 is valid between authentication time 16, 17 and the end of the action, the privilege was required for. The link 4 becomes invalid at the time 20, 21 the action, executed based on the privilege 2, has stopped. Similar, if multiple usages of a privilege 2 are permitted, a usage-counter may be maintained in the central or distributed data base 9 and/or in the programmable device 5 itself.

Figure 5:
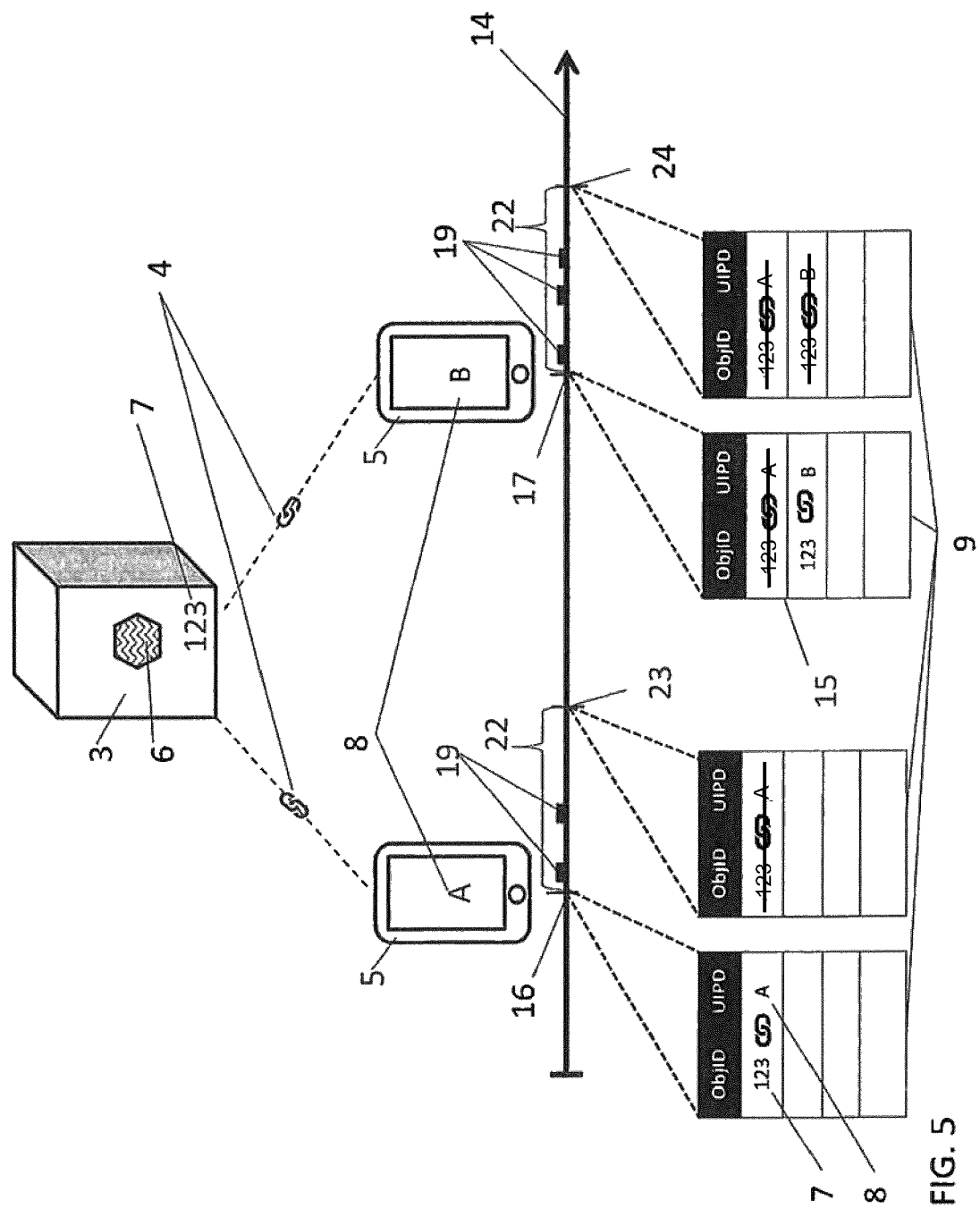
FIG. 5 schematically illustrates the assignment of single-use (or limited-access) privileges to different programmable devices over time.

Time-limited links 4, as shown in FIG. 5, are valid only for a certain predefined validity period 22 after they've been established. When they are established at authentication time 16, 17, they remain valid within the validity period 22. During this period, the privilege 2 may be used or exercised as often as desired, i.e. in general multiple times 19. After that validity period 22, the link 4 is (preferably without the need of an interaction with any programmable device 5) set to invalid and the programmable device 5 consequently loses the privilege(s) 2 at the time 23, 24 at which the validity period 22 ends. This may be done asynchronously by a (not pictured) asynchrony service, which monitors and manages the list 15 of valid links 4 in the centralized or distributed list or data base 9. If the list of 15 of valid links is maintained at the uniquely identifiable programmable device itself, such a service may operate there or upon the next attempt to use or exercise the privilege 2 invalidity of the link is detected, e.g. on time-constraints.

It is furthermore important to note that the link between the uniquely identifiable object and the uniquely identifiable programmable device is not necessarily a direct link; instead said link may comprise connected intermediary links. In a preferred embodiment, said link comprises a first intermediary link between a uniquely identifiable object and a user-account and a second intermediary link between said user-account and a uniquely identifiable programmable device. In this case the user-account functions as an intermediary between the uniquely identifiable object and the uniquely identifiable programmable device. The user-account is registered to one or more uniquely identifiable devices (i.e. the second intermediary links are already established). For establishing the link, the privileges need only be "transferred" from the uniquely identifiable object to the user-account (i.e. establishing the first intermediary link and thus completing the link). Each uniquely identifiable programmable device, which is configured to represent said user-account, may then access or execute the privileges registered to the user-account. This enables to transferring or sharing privileges from a user-account to another uniquely identifiable programmable device. A primary consideration here is the possibility that uniquely identifiable programmable devices break. Consequently, established links, which may only be cleared for transaction by the uniquely identifiable programmable device, could freeze, as soon as the device breaks, simply because there is no way to declare that now other devices are allowed to establish new links. User-accounts may help to overcome this issue.

Due to the fact that at the same time at most one programmable device can be connected to a particular physical product (forming a uniquely identifiable object) a wide range of applications emerge;

Claim ownership. If one programmable device is connected or linked to the physical product, it "owns" the product. Consequently, if another programmable device connects to the product (by establishing a link), it would gain ownership. Naturally, one has to define rules here, e.g. a programmable device can only connect to a physical product as long as no other programmable device is connected or a new connection automatically cancels the old one. Technically, a pool of valid links has to be maintained, preferably in a centralized data base.

Short-term benefits. A link between a physical product and a programmable device is only valid for a certain period of time before it ceases. The programmable device can only access the digital content registered to the physical product for a certain period of time. If this time-span elapsed, it can for instance scan the product again to get another time-slot. A fairly easy example would be 24 hr Wi-Fi-Access, that is activated by scanning a product acting as a token, which is located in a physically restricted area, e.g. in a hotel room.

Physical restricted token; Place a physical object in a physically restricted area. Only people allowed to the physically restricted area are able to authenticate the token-object and therefore only these people are allowed to access a certain digital service (i.e. acquire the privilege to access to said service via a link to the physical object).

Use-Cases

The following section should aid the comprehension of the present teaching and present use-cases, which benefit or are enabled by using the present teaching. There are two main use-case categories and related benefits. Firstly, the privilege to execute or trigger the execution of a computer program requires the presence of a physical object and secondly, that a secure bridge between the physical world and the digital world can be established, i.e. the object is registered to the privilege to access a computer program, which acts a digital representation of the object. Abstractly, this allows a computer network to inter-act with the digital representation of a non-computer object.

License container: A uniquely identifiable physical object may be a license container. Let's consider a company wants to distribute its products not physically, but rather distribute the raw material and license the buyer of the raw material to change its shape. More specific, let's consider 3D ink. If a company sells 3D-Ink, the ink package (=uniquely identifiable object) may be equipped with said irreproducible security device 6 and an object identifier 7. For example, if the 3D printer (or a computer attached to it) is configured to be the programmable device 5 of the present teaching, the ink package could transfer the license to access (and print) certain 3D-models (=privilege). These models are then only accessible to buyers of a particular ink, identified from the object identifier 7. This could protect brands, which offer a specific, high quality ink material compatible with certain 3D models from being mimicked with lower quality (cheaper) ink material. Consequently, the 3D models are only accessible with the matching ink. This use-case can be adapted to any use-case, where a certain digital content, e.g. a computer program, should only be accessible in combination with a certain physical object. Another illustrative example may be selling physical fan articles, e.g. swords present in computer games, where the buyer of the physical article may be able to link his user or character in the computer game (computer-program) to the uniquely identifiable physical object and will therefore get the privilege of using a digital representation of this sword in-game.

The present teaching provides a possibility to claim digital ownership of a physical object. Consequently, transferring the digital ownership may be bound to also transferring the physical object. Respectively, physical transactions may be verified by checking the current digital ownership status of the object. A prominent example is second-hand bicycles or cars (physical object). Those objects are regular subjects to thefts and quite often a buyer of a second-hand bicycle or car cannot tell whether he or she is buying a stolen one, i.e. the seller is not the legitimate owner, or whether the seller is legitimated to sell this car. In this case it may be beneficial, if the buyer of a factory-new car claims ownership by means of the present teaching. The legitimate owner linked his or her uniquely identifiable programmable device 5 (or an account related to the uniquely identifiable programmable device) to the uniquely identifiable physical object. If he is about to sell his car, he releases the claimed ownership, i.e. he invalidates the link with his uniquely identifiable programmable device 5. Prior to buying, the buyer is then advised to claim ownership of the car (physical object) with his uniquely identifiable programmable device 5, i.e. he tries to link his programmable device 5 to the physical object he's about to buy. If ownership cannot be claimed, i.e. because there is still a valid link between the desired physical object and another uniquely identifiable programmable device 5, this indicates that the transaction is illegitimate, i.e. the car may be a stolen car. In a desirable setting, namely that all cars or at least all cars of a certain brand, are equipped with the present teaching, this would mean that a gapless ownership history may be obtained. As long as no new car remains unclaimed, i.e. has no valid link registered, this potentially could drastically increase the difficulty to deal with stolen goods, since a transaction of the physical good can easily be checked by the buyer before making the transaction.

As for transactions, as a transaction log a simple ownership history may be maintained or other transaction constructs, which ensure integrity, may be used as a data base for storing links, e.g. block chains, which may also be distributed among multiple programmable devices 5 instead of a centralized (trusted) data base keeping the records.

Another (not pictured) example could be building an alternative to online payment services in online shopping. Again, the largest benefit here is for the transaction between a buyer and an untrusted seller or vice versa, i.e. second-hand trades. The data base 9 acts as a trusted mediator in this case. The seller, which legitimately owns a uniquely identifiable object 3 through a valid link 4, sets the link 4 to a state signaling that he is ready to transfer the object. A transaction ID may be issued, which he can transfer by means of telecommunication to the buyer of the object. The buyer may then deposit money at the trusted mediator, which is linked to the buyer's programmable device 5 and the transaction ID. The trusted mediator then signals the seller that money is at disposal, which allows him to actually transfer the physical object to the seller, e.g. via postal service. At this point the money is at disposal at the trusted authority as well as there is precisely one uniquely identifiable programmable device pre-registered, which may claim ownership of the physical object. All other links will not be accepted by the trusted mediator, i.e. an illegitimate third party may not be able to claim ownership. If the physical object is received by the buyer, he may check its condition and if he is satisfied, he may claim ownership, i.e. he links his uniquely identifiable programmable device 5 to the object identifier 7. The establishment of a new link 4 triggers the trusted mediator to transfer the disposed money to the seller and the transaction is completed. If the buyer is not satisfied by the condition of the received good, he may send it back to the seller. If the seller receives the reclamation, he may confirm the reception of the physical good by claiming ownership again. This causes the trusted mediator, i.e. the data base 9, to wire the disposed money back to the buyer and the seller is free to dispose over the physical object at free will again. This setting can be transferred to any purchasing/payment processes, where the two contractors are not in direct contact, i.e. the transaction cannot be aborted or verified immediately.

Other use-cases emerge, which are enabled through requiring physical proximity between the uniquely identifiable programmable device and the object. Therefore, physical constraints applied to the object simultaneously constraint the usage or execution of the assigned privileges. For example, the playback of a live concert should only be accessible for people who were in the audience. This could be realized by placing an immobile object in the concert hall, where only people who bought a ticket will get physical access to. The people may then link their uniquely identifiable programmable devices 5, i.e. a smart phone, to the immobile object via the object's identifier 7. As soon as the link 4 is created, the particular programmable device 5 linked to the immobile uniquely identifiable object 3 may access the record of the live concert (privilege to access file or stream), while it is impossible to access the record from any other device, which cannot be linked to the immobile object due to physical access control. This use-case may be generalized to any application, where physical proximity between a uniquely identifiable programmable device 5 and a physical object is the enabler to allow the uniquely identifiable programmable device 5 to exercise a privilege (e.g. execute a computer program, access a file or database, or play a music or video stream). Consequently, e.g. the execution of a computer program may be restricted using physical restriction measures to the enabling object. This may also be used for computer program activation, because it requires that at least the physical object, acting as a key, is transferred in order to allow the computer program to be executed on a specific uniquely identifiable programmable device 5. Consequently, the current present teaching may be utilized to counteract software piracy by using an irreproducible physical token for software activation.

Additional use-cases of the present teaching:

Authentication of debit card payments, by acquiring the privilege to use the debit card (uniquely identifiable object) according to the present teaching.

A lot stronger than the 3-digit secure code and "valid-until" verification procedure, which is state of the art in many payment solutions nowadays. Prevents illegitimate use of a debit card (without the debit card being actually stolen from the owner), which is presently perfectly possible by simply knowing the numbers.

Physical access restriction (e.g. as a Private key, unlock documents in the cloud).

A user needs to have a physical key (uniquely identifiable object) close to his uniquely identifiable programmable device in order to get certain digital permissions, access documents etc. This could be of use to counter the reluctance against storing documents in the cloud, because the documents could only be made accessible for devices close to a physical token. As long as this physical token is e.g. in a safe, nobody would be able to open the documents; this widely corresponds to the concert use-case discussed above in more detail.

Physical digital rights management/access media when a physical token, i.e. uniquely identifiable object, is present. For example, a marketing strategy may be: a user may access a service (take a picture and store it on a beverage can) and each time they scan the very same beverage can, they can see the picture again (acquire the privilege to access the image file). Without having the beverage can, they won't be able to see the picture again. Therefore, a photo (=memories, feelings) is "stored at" a physical object, strengthening the emotional value of an object.

Right to Support or Validity of Support Contract

The user proves the right (privilege) to enjoy services such as software support/maintenance etc. by proving they bought the original product. I.e. they can acquire support with their uniquely identifiable programmable device only if it is close to the original product or product packaging (uniquely identifiable object).

Machine Parameters for Industrial Applications

When purchasing original tools, i.e. carbide inserts for drills etc., scanning the packaging allows the user access optimal machine parameters such as drill speed etc. and/or the machine adjusts itself automatically. This is similar to the 3D-ink use-case discusses above.

Figure 6:
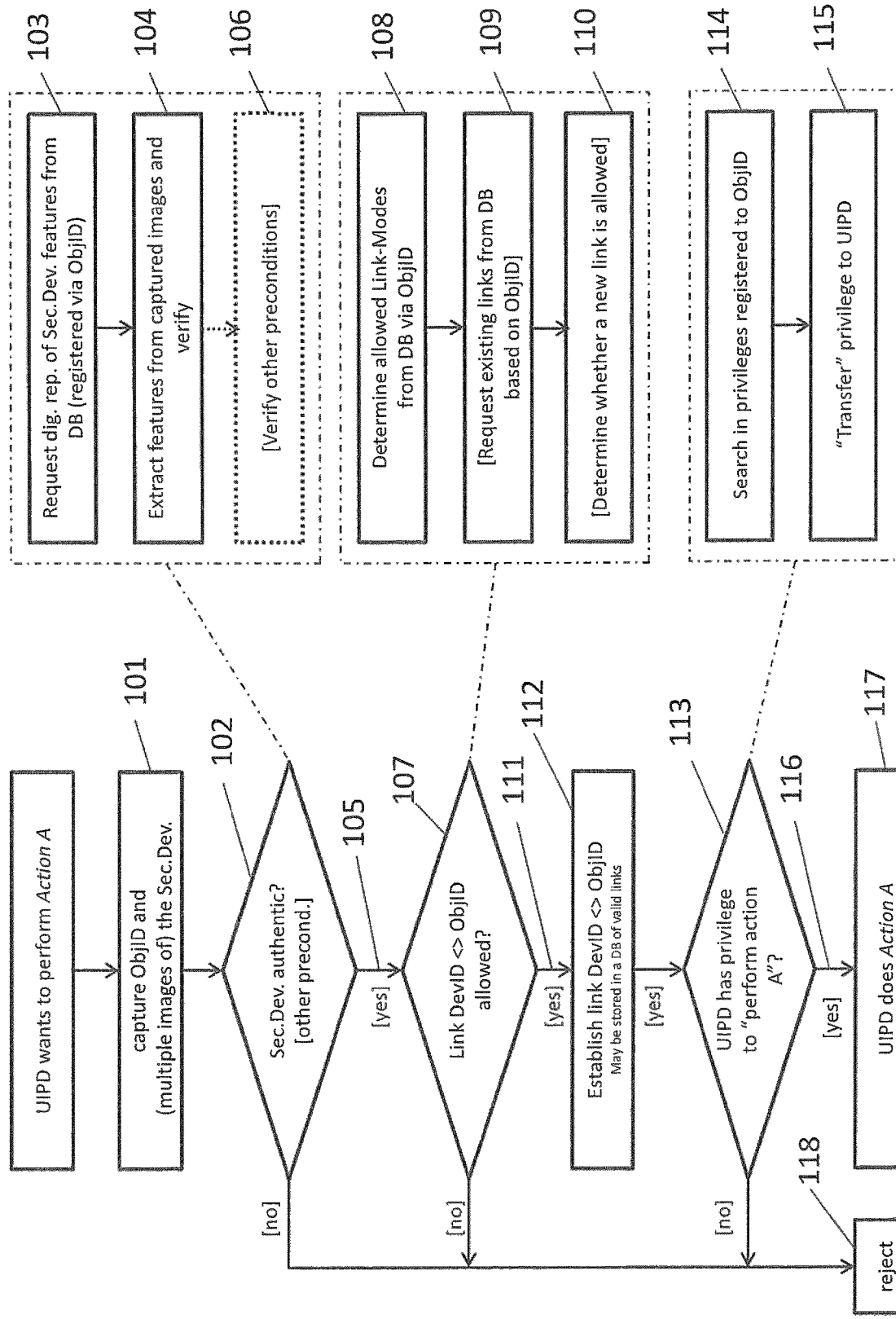
FIG. 6 shows a flow chart of a preferred embodiment of the method according to the present teaching.

FIG. 6 illustrates a preferred embodiment of the present method. It shows the principal steps involved when a user wants to perform an exemplary "Action A" with his uniquely identifiable programmable device. This action could for example be the execution of a computer program, the access to a document etc. The action requires the user to have the privilege of performing it (i.e. the action applies access restrictions with regard to the uniquely identifiable programmable device performing it). In a first step 101, the unique object identifier 7 and the irreproducible security device 6 are captured by the programmable device 5, i.e. at least one image of the unique object identifier and of the irreproducible security device 6 is taken, e.g. with a camera of the programmable device 5. In the next step 102, the irreproducible security device 6 is authenticated based on the captured data. In particular, the digital representation is extracted from the at least captured image. One possibility to authenticate the irreproducible security device 6 is: to request 103 a reference of a digital representation of an irreproducible security device from a data base using the unique object identifier (i.e. querying the database for digital representations associated with the unique object identifier); to extract 104 characteristic features of the irreproducible security device 6 from captured images, determine a digital representation of the irreproducible security device 6 and compare the digital representation with the requested reference. If this comparison is successful 105 (i.e. the comparison determines a match), physical proximity between the uniquely identifiable programmable device and the uniquely identifiable object is guaranteed. Optionally further preconditions (such as that the geographic location or other sensor readings of the programmable device is/are within a predefined acceptable range) may be evaluated 106 before authenticating the irreproducible security device. If the security device cannot be authenticated, the procedure is cancelled without establishing a new link. Then it is checked 107 whether a new link between the uniquely identifiable object 3 and the uniquely identifiable programmable device 5 is allowed, i.e. possible. This could for instance not be the case 106 if only one device may be registered to the object and there is already a valid link. In the present example, in order to determine whether a new link is allowed, allowed link-modes are requested 108 from the data base using the unique object identifier 7. The link-mode defines the link policy, e.g. permanent links, temporary links, quantity-limited links, single-use links, etc. If relevant for the determined link-mode, existing links comprising the unique object identifier 7 are requested 109 from the data base. Based on the link-mode and optionally the outcome of this request, it is determined 110 whether a new link is allowed. In case the link is allowed 111, in a next step 112 the link is established by storing an association between the unique device identifier 8 and the unique object identifier 7 in the database 9. The privileges 2 associated with the unique object identifier 7 are now also at the disposal for the uniquely identifiable programmable device 5. If the user now tries to perform Action A, all privileges linked to the uniquely identifiable programmable device 5 are examined 113, i.e. whether at least one privilege is the permission to perform Action A. For example, based on all links 4 comprising the unique device identifier of the programmable device the linked unique object identifiers and the privileges associated with these linked unique object identifiers are determined 114. Then the associated privileges are transferred 115 to the programmable device and it is determined whether they include the privilege to perform Action A. If this is the case 116, then Action A can be executed 117 by the programmable device 5, e.g. a computer program being run or a service or action being triggered through the uniquely identifiable programmable device. In case any of the checks 102, 107, 113 fails, the Action A cannot be performed and the uniquely identifiable programmable device may display 118 a message or error code indicating what went wrong or why the Action A may not be performed.

The invention claimed is:

1. A system to manage privileges, comprising:
a uniquely identifiable object including an irreproducible security device;
a uniquely identifiable programmable device having an optical authenticator;
wherein privileges are assigned to the uniquely identifiable object and a link between the uniquely identifiable object and the uniquely identifiable programmable device is established;
wherein the established link allows the uniquely identifiable programmable device to make use of at least a part of the privileges assigned to the uniquely identifiable object and where the link is established under a set of preconditions;
wherein the established link is recorded in a blockchain;
where the set of preconditions includes a precondition of physical proximity between the uniquely identifiable object and the uniquely identifiable programmable device is verified;
wherein the irreproducible security device is a time-invariant security device that is permanently attached to or integrated with the uniquely identifiable object;
wherein the irreproducible security device includes a hologram or a 3-dimensional structure having a random distribution of perspective-dependent optical characteristics which are registered to an object identifier;
wherein the irreproducible security device is registered to the uniquely identifiable object;
wherein the physical proximity is established by optically authenticating the irreproducible security device with the optical authenticator;
wherein at least a part of the optically authenticating is carried out by the uniquely identifiable programmable device.

2. The system according to claim 1, wherein one or more of a group of additional preconditions are verified to establish the link, the group of additional preconditions including: the geographic location of the uniquely identifiable programmable device is within a predefined geographic area; or other data which may be retrieved from the uniquely identifiable programmable device's sensors or memory, wherein a link can only be established if this data corresponds to certain preconfigured values.

3. The system according to claim 1, wherein the privileges are stored in a centralized or distributed data base.

4. The system according to claim 1, wherein the privileges comprise the permission to access a computer program, or the permission to trigger the execution of a computer program on a third device, with the uniquely identifiable programmable device and/or permission to establish a link.

5. The system according to claim 1, wherein the privileges comprise granting access to a database and allowing changing privilege assignments.

6. The system according to claim 1, wherein the data base includes a blockchain structure.

7. The system according to claim 1, wherein the irreproducible security device includes a 3-dimensional structure having a random distribution of perspective-dependent optical characteristics which are registered to an object identifier and the uniquely identifiable programmable device includes a camera which may be used to capture at least two images of the irreproducible security device from at least two different perspectives or with two different lighting conditions.

8. The system according to claim 1, wherein the uniquely identifiable object includes a unique object identifier, wherein the unique object identifier is encoded in human- or machine-readable format.

9. The system according to claim 1, wherein the link between the uniquely identifiable object and the uniquely identifiable programmable device includes two or more connected intermediary links.

10. A method for acquiring privileges with a programmable device having a unique device identifier, the method including:
capturing with the programmable device at least two images, wherein at least one image pictures a unique object identifier of an object and at least two images picture an irreproducible security device of the object, wherein the irreproducible security device is a time-invariant security device that is permanently attached to or integrated with the object and wherein the irreproducible security device includes hologram or a 3-dimensional structure having a random distribution of perspective-dependent optical characteristics which are registered to an object identifier;
optically authenticating the irreproducible security device based on the at least two images;
if all preconditions of a set of preconditions are fulfilled, establishing a link between the unique device identifier and the unique object identifier;
recording the established link in a blockchain;
wherein the set of preconditions includes at least the precondition of physical proximity between the object and the programmable device;
wherein the physical proximity is established when the irreproducible security device has been optically authenticated;
wherein one or more privileges are pre-defined and associated with the unique object identifier;
wherein at least a part of the one or more privileges is granted to any programmable device having a unique device identifier linked to the unique object identifier.

11. The method according to claim 10, wherein optically authenticating the irreproducible security device includes:
extracting a digital representation of one or more optical security features from the at least two images;
comparing the digital representation with a reference;
authenticating the irreproducible security device if the digital representation matches the reference.

12. The method according to claim 11, wherein authenticating the irreproducible security device includes:
obtaining the reference from a data base.

13. The method according to claim 10, comprising:
before establishing a link between the unique device identifier and the unique object identifier, determining whether the unique object identifier is already linked to one or more different unique device identifiers;
establishing a link between the unique device identifier and the unique object identifier only if the unique object identifier is not linked to any different unique device identifier.

14. The method according to claim 12, wherein the obtaining the reference comprises querying the data base with the captured unique object identifier.

15. The system according to claim 8, wherein the unique object identifier comprises a numerical or alphanumerical number or a barcode or 2D code.

16. The system according to claim 9, wherein the two or more connected intermediary links comprise a first intermediary link between the uniquely identifiable object and a user-account and a second intermediary link between the user-account and the uniquely identifiable programmable device.

\* \* \* \* \*